United States Patent
Hsu et al.

(10) Patent No.: US 9,501,995 B2
(45) Date of Patent: Nov. 22, 2016

(54) LIQUID CRYSTAL DISPLAY AND METHOD OF CHARGING/DISCHARGING PIXELS OF A LIQUID CRYSTAL DISPLAY

(71) Applicant: AU Optronics Corp., Hsin-Chu (TW)

(72) Inventors: Kuo-Hua Hsu, Hsin-Chu (TW); Yung-Chih Chen, Hsin-Chu (TW); Kuo-Chang Su, Hsin-Chu (TW); Yu-Chung Yang, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/561,227

(22) Filed: Dec. 5, 2014

(65) Prior Publication Data

US 2015/0084948 A1   Mar. 26, 2015

Related U.S. Application Data

(62) Division of application No. 13/450,430, filed on Apr. 18, 2012, now abandoned.

(30) Foreign Application Priority Data

May 23, 2011   (TW) .............................. 100117917 A

(51) Int. Cl.
*G09G 5/00*   (2006.01)
*G09G 3/36*   (2006.01)
(Continued)

(52) U.S. Cl.
CPC ......... *G09G 3/3696* (2013.01); *G02F 1/13306* (2013.01); *G02F 1/136286* (2013.01); *G09G 3/3648* (2013.01); *G09G 3/3677* (2013.01); *G09G 2310/0205* (2013.01); *G09G 2310/0248* (2013.01); *G09G 2310/0297* (2013.01)

(58) Field of Classification Search
CPC ............. G09G 3/3648; G09G 3/3674; G09G 3/3677; G09G 3/3685; G09G 3/3688
USPC .................................................. 345/87–104
See application file for complete search history.

(56) References Cited

U.S. PATENT DOCUMENTS

| 7,057,589 B2 | 6/2006 | Shin |
| 7,701,426 B2 | 4/2010 | Yokoyama et al. |
| 7,764,350 B2 * | 7/2010 | Kim ...................... G02F 1/1345 349/139 |

(Continued)

FOREIGN PATENT DOCUMENTS

| CN | 1420387 A | 5/2003 |
| CN | 1447302 A | 10/2003 |

(Continued)

*Primary Examiner* — Jimmy H Nguyen
(74) *Attorney, Agent, or Firm* — Locke Lord LLP; Tim Tingkang Xia, Esq.

(57) ABSTRACT

A liquid crystal display includes a liquid crystal panel, a source driving circuit, a timing controller, and a gate driving circuit. The source driving circuit converts frame data into a plurality of data voltages, and charges/discharges a first data line according to a data voltage of the plurality of data voltages. The gate driving circuit enables a gate line corresponding to the data voltage. The timing controller sequentially enables a plurality of switch enable lines corresponding to the gate line. A plurality of pixel switches are turned on according to the enabled gate line. A data line switch is turned on according to an enabled switch enable line. The data voltage charges/discharges a corresponding pixel through the turned-on data line switch and one of the turned-on pixel switches.

6 Claims, 8 Drawing Sheets

(51) Int. Cl.
*G02F 1/133* (2006.01)
*G02F 1/1362* (2006.01)

(56) References Cited

U.S. PATENT DOCUMENTS

| | | |
|---|---|---|
| 2003/0063048 A1 | 4/2003 | Nakano |
| 2003/0179164 A1 | 9/2003 | Shin et al. |
| 2008/0165111 A1 | 7/2008 | Pai |
| 2009/0040161 A1 | 2/2009 | Baek et al. |
| 2010/0187523 A1 | 7/2010 | Sakata |
| 2010/0253866 A1 | 10/2010 | Lan |
| 2011/0074712 A1 | 3/2011 | Bak |
| 2011/0169793 A1 | 7/2011 | Chen et al. |

FOREIGN PATENT DOCUMENTS

| | | |
|---|---|---|
| CN | 101364391 A | 2/2009 |
| TW | 200518025 | 6/2005 |
| TW | 200830244 | 7/2008 |
| TW | 200912845 | 3/2009 |
| TW | 201110085 | 3/2011 |

* cited by examiner

… (1)

LIQUID CRYSTAL DISPLAY AND METHOD OF CHARGING/DISCHARGING PIXELS OF A LIQUID CRYSTAL DISPLAY

CROSS REFERENCE TO RELATED APPLICATION

This application is a divisional application of U.S. application Ser. No. 13/450,430 filed Apr. 18, 2012, now abandoned, which claims priority to Taiwan Patent Application No. 100117917, filed May 23, 2011, each of which is incorporated herein by reference in its entirety.

BACKGROUND OF THE INVENTION

1. Field of the Invention

The present invention relates to liquid crystal displays and methods of charging pixels of liquid crystal displays, and particularly to a liquid crystal display and method of charging pixels thereof that utilize enable signals of two partially-overlapping consecutive gate lines and sequentially-enabled switch enable lines to extend pixel charging time.

2. Description of the Prior Art

Please refer to FIG. 1A and FIG. 1B. FIG. 1A is a diagram illustrating a liquid crystal display (LCD) 100 capable of reducing first data lines of a source driving circuit. FIG. 1B is a diagram illustrating timing of operating gate lines G1, G2, G3 and switch enable lines SW1, SW2, SW3 of the prior art. As shown in FIG. 1A, first data line FD1 of source driving circuit corresponds to second data lines SD11, SD12, SD13, and first data line FD2 of source driving circuit corresponds to second data lines SD21, SD22, SD23. Thus, liquid crystal display 100 uses switch enable lines SW1, SW2, SW3 and a plurality of data line switches DS11, DS12, DS13, DS21, DS22, DS23 to reduce number of first data lines of source driving circuit. As shown in FIG. 1B, when gate line G1 is enabled and switch enable lines SW1 are enabled, data voltage of first data line FD1 charges second data line SD11 through data line switches DS11, and second data line SD11 charges pixel P11 through pixel switch PW11. Likewise, when gate line G1 is enabled and switch enable line SW2 is also enabled, data voltage of first data line FD1 charges second data line SD12 through data line switch DS12, and second data line SD12 charges pixel P12 through pixel switch PW12. When gate line G1 is enabled and switch enable line SW3 is also enabled, data voltage of first data line FD1 charges second data line SD13 through data line switches DS13, and second data line SD13 charges pixel P13 through pixel switch PW13. As shown in FIG. 1B, because switch enable lines SW1, SW2, SW3 are enabled sequentially, charge time of pixel P11 is interval T1, charge time of pixel P12 is interval T2, charge time of pixel P13 is interval T3, where T1>T2>T3, which causes charge rates of pixel P11, pixel P12, and pixel P13 to be different. Thus, liquid crystal display 100 exhibits color distortion.

SUMMARY OF THE INVENTION

According to an embodiment, a liquid crystal display (LCD) comprises an LCD panel, a source driving circuit, a gate driving circuit, and a timing controller. The LCD panel comprises a plurality of pixels. Each pixel of the plurality of pixels is coupled to a corresponding pixel switch. The source driving circuit is for converting image data into a plurality of data voltages and enabling M first data lines. M is a positive integer. Each first data line of the M first data lines corresponds to a plurality of data line switches, and the first data line charges/discharges according to a data voltage corresponding to the first data line. Each data line switch of the plurality of data line switches corresponds to one second data line and one switch enable line of a plurality of switch enable lines. The gate driving circuit is for enabling N gate lines, where N is a positive integer. The timing controller is for enabling the plurality of switch enable lines. Enable signals of a gate line and a next gate line corresponding to the gate line are partially overlapping.

According to an embodiment, a method of charging/discharging pixels of a liquid crystal display is provided. The liquid crystal display comprises an LCD panel, a plurality of switch enable lines, a source driving circuit and a gate driving circuit. The method comprises converting image data into a plurality of data voltages, charging/discharging a first data line corresponding to a data voltage of the plurality of data voltages according to the data voltage, enabling a gate line corresponding to the first data line of a plurality of gate lines, sequentially enabling all switch enable lines corresponding to the gate line of a plurality of switch enable lines, turning on a plurality of pixel switches corresponding to a gate line that is asserted according to the gate line, turning on a data line switch corresponding to switch enable lines that are asserted according to the switch enable lines, the data voltage charging/discharging a second data line corresponding to a data line switch that is turned on through the data line switch, and the second data line that is being charged/discharged charging/discharging a pixel corresponding to a pixel switch that is turned on of the plurality of pixel switches through the pixel switch. Enable signals of the gate line and a next gate line corresponding to the gate line are partially overlapping.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
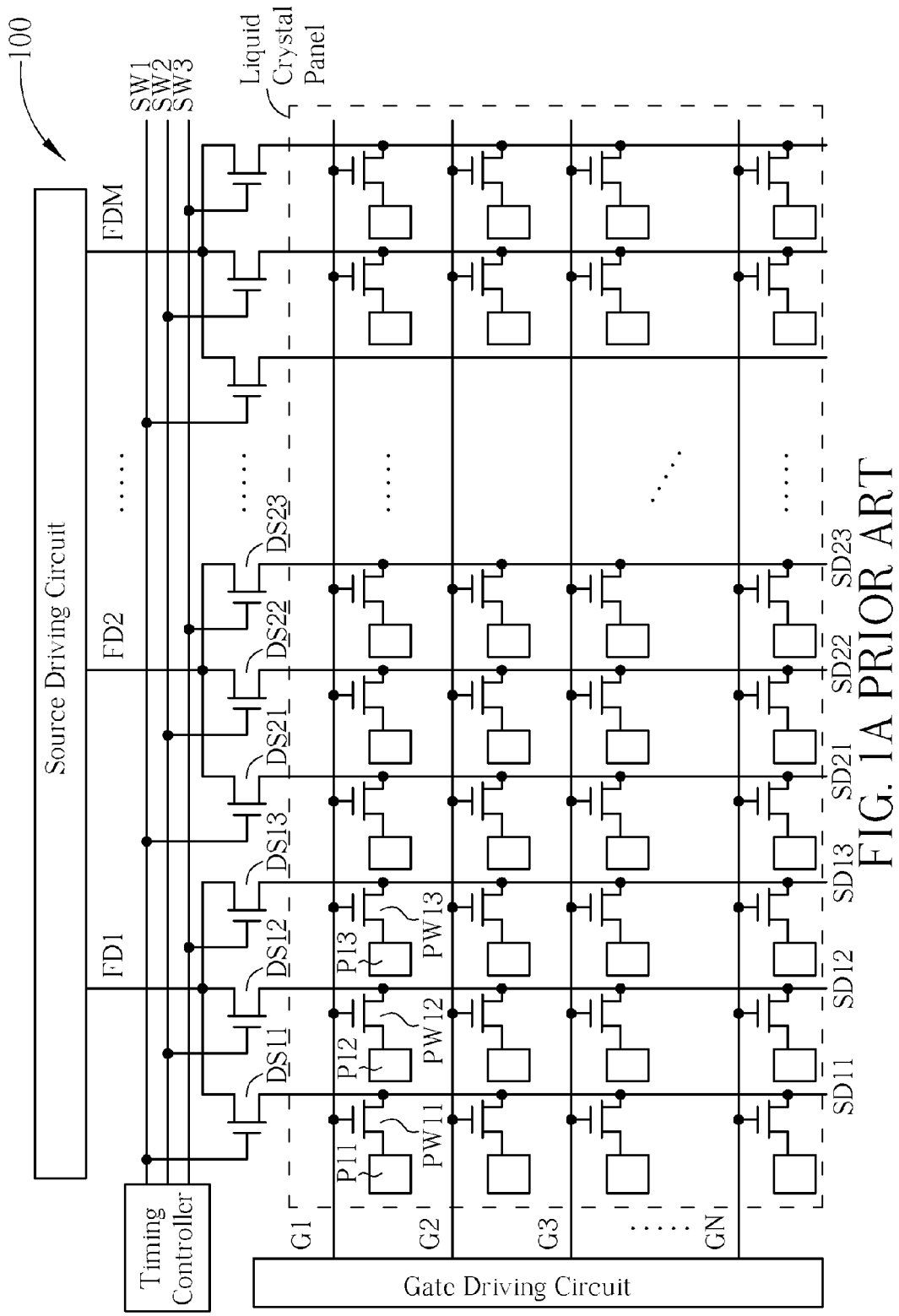
FIG. 1A is a diagram illustrating a liquid crystal display capable of reducing first data lines of a source driving circuit.
Figure 1B:
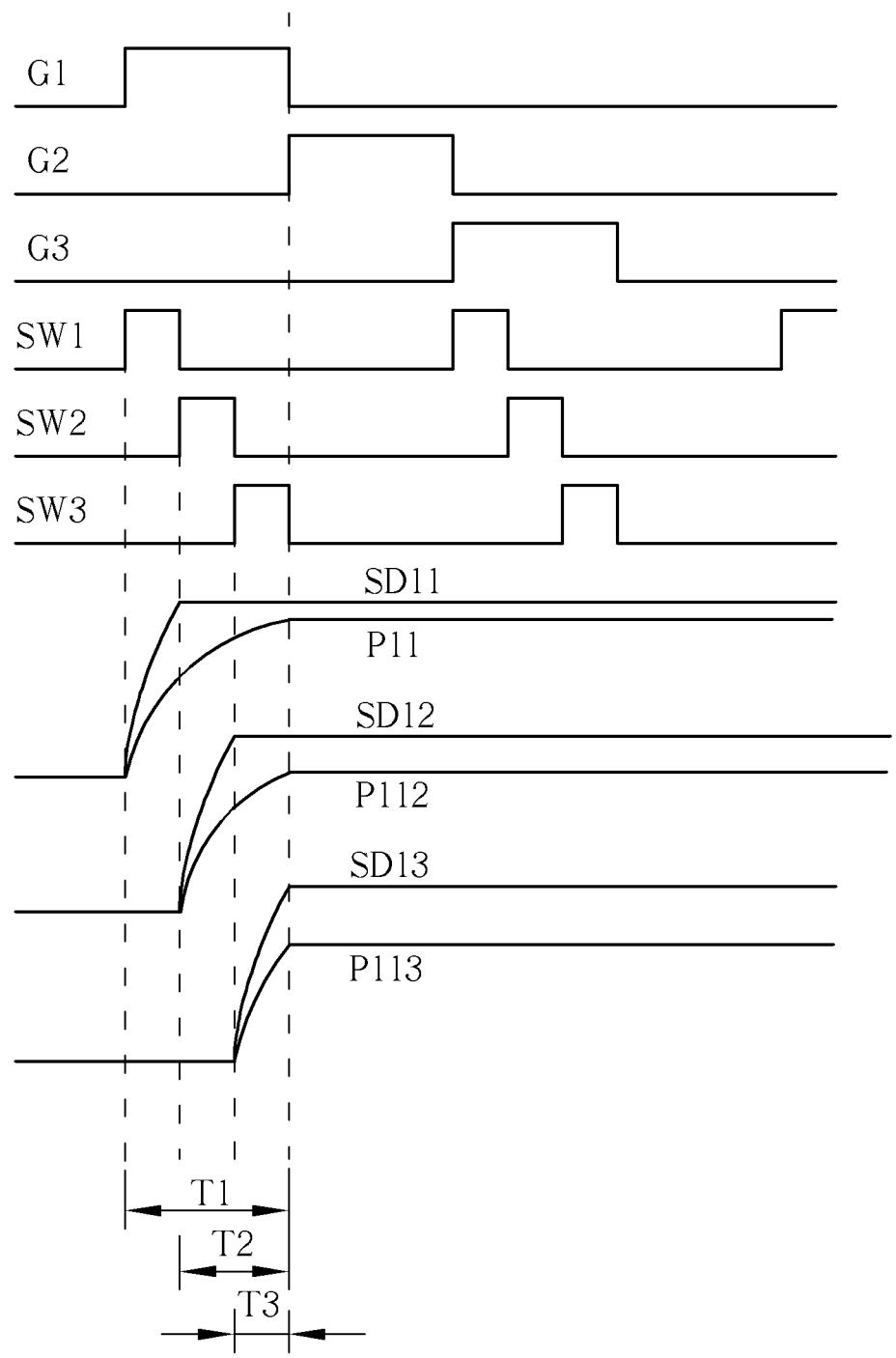
FIG. 1B is a diagram illustrating timing of operating gate lines and switch enable lines of the prior art.
Figure 2A:
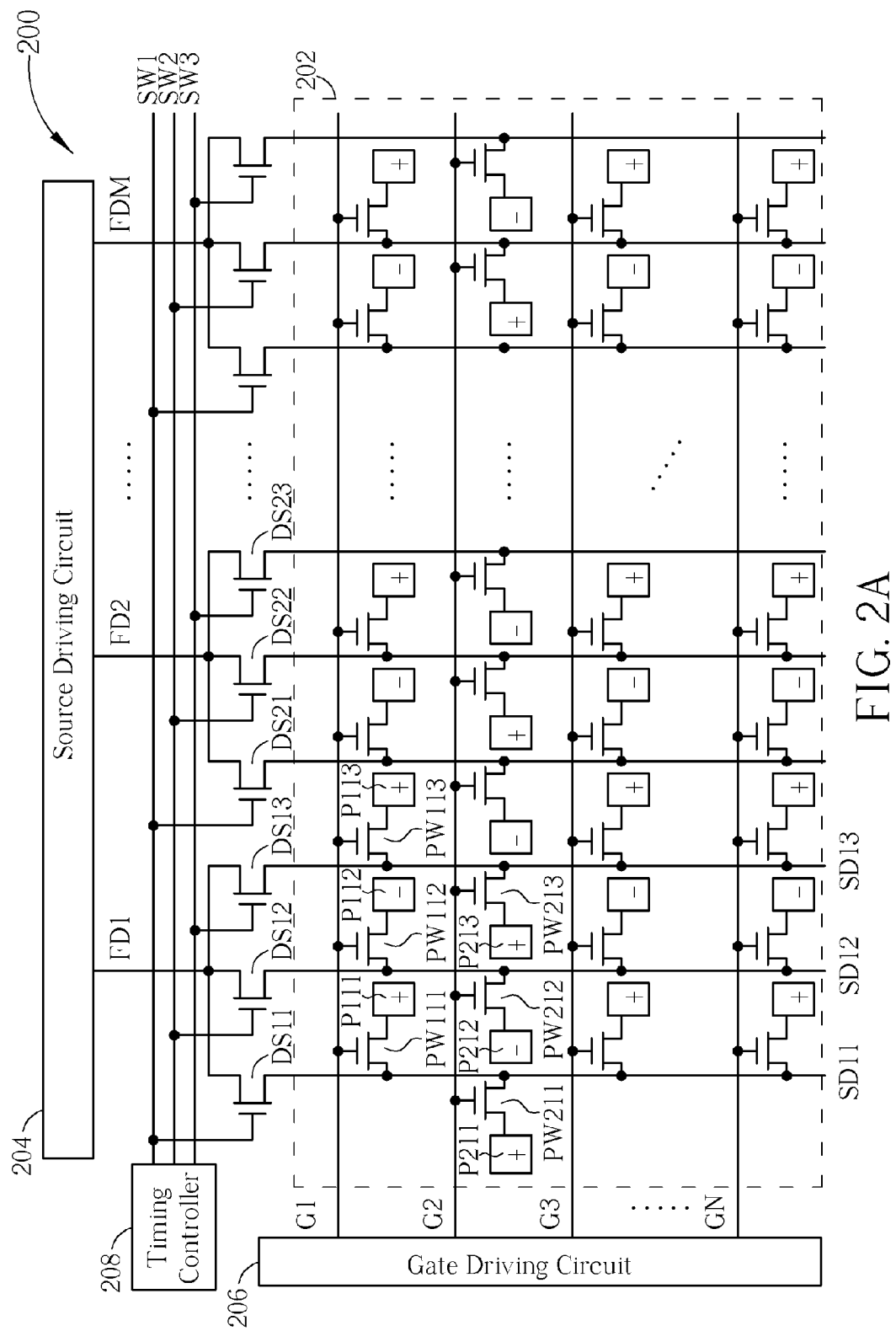
FIG. 2A is a diagram illustrating liquid crystal display.
Figure 2B:
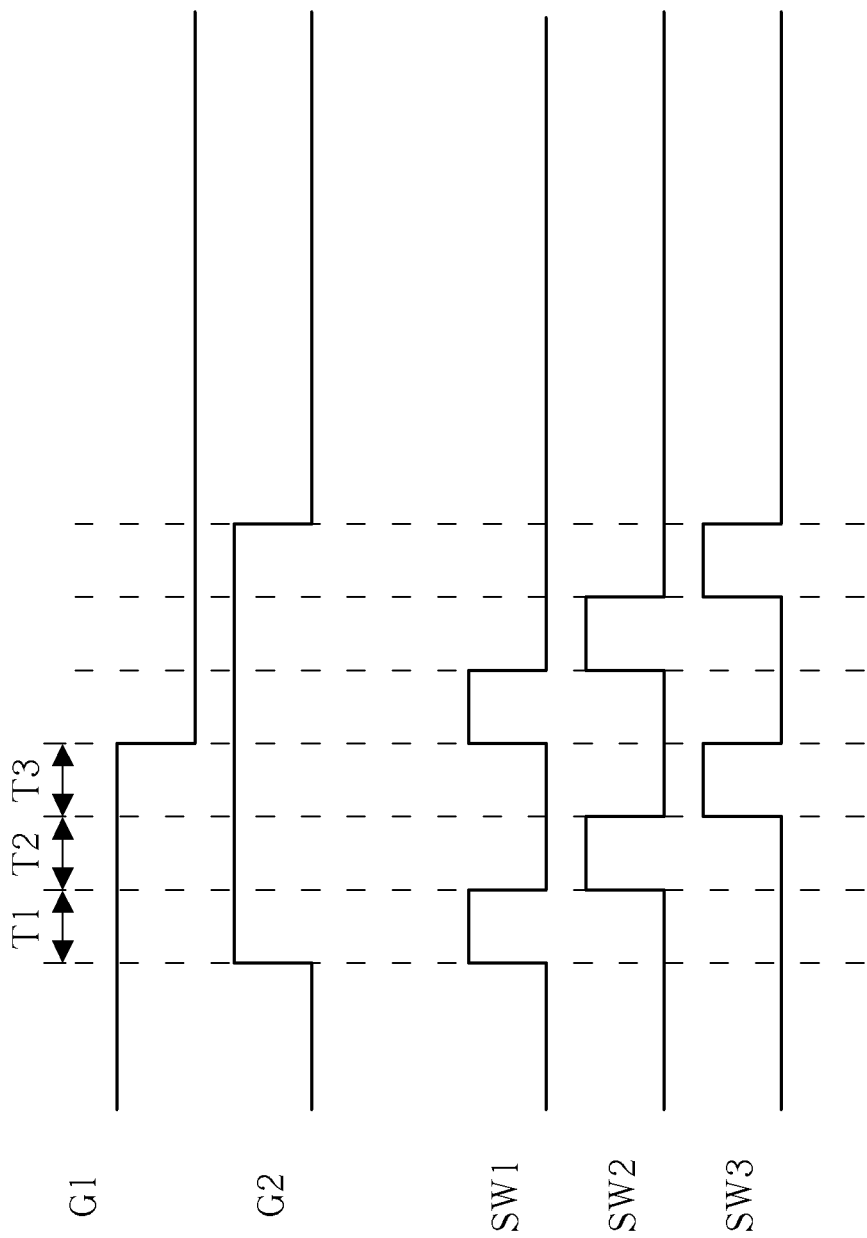
FIG. 2B is a diagram illustrating timing of operations of liquid crystal display.

Please refer to FIG. 2A and FIG. 2B. FIG. 2A is a diagram illustrating liquid crystal display 200, and FIG. 2B is a diagram illustrating timing of operations of liquid crystal display 200. Liquid crystal display 200 comprises LCD panel 202, source driving circuit 204, gate driving circuit 206, and timing controller 208. LCD panel 202 comprises a plurality of pixels, and each pixel of the plurality of pixels is coupled to a corresponding pixel switch, where each pixel switch is an N-type thin-film transistor or P-type thin-film transistor. Source driving circuit 204 is used for converting image data to a plurality of data voltages and enabling M first data lines FD1-FDM, where M is a positive integer. Each first data line of M first data lines FD1-FDM corresponds to a plurality of data line switches, and each first data line is charged/discharged according to a corresponding data voltage, where each data line switch corresponds to one second data line and one switch enable line of three switch enable lines SW1-SW3, and each data line switch is either an N-type thin-film transistor or P-type thin-film transistor. For example, first data line FD1 corresponds to three data line switches DS11, DS12, DS13, first data line FD2 corresponds to three data line switches DS21, DS22, DS23, data line switch DS11 corresponds to second data line SD11 and switch enable line SW1, data line switch DS12 corresponds to second data line SD12 and switch enable line SW2, and data line switch DS13 corresponds to second data line SD13 and switch enable line SW3. Gate driving circuit 206 is used for enabling N gate lines G1-GN, where N is a positive integer, and enable signals of two neighboring gate lines are partially overlapping. Timing controller 208 is for sequentially enabling a plurality of switch enable lines SW1-SW3.

As shown in FIG. 2B, while gate line G1 is enabled, and source driving circuit 204 charges/discharges first data line FD1 according to corresponding data voltage, gate line G2 is pre-enabled, namely enable signal of gate line G1 and enable signal of gate line G2 partially overlap. Thus, when switch enable line SW1, gate line G1 and gate line G2 are both enabled (period T1 of FIG. 2B), first data line FD1 charges/discharges second data line SD11 through turned on data line switches DS11 according to corresponding data voltage, and second data line SD11 charges/discharges pixel P111 through turned on pixel switch PW111 according to corresponding data voltage. At this time, because gate line G2 is also enabled, second data line SD11 also charges/discharges pixel P211 through turned on pixel switch PW211 according to corresponding data voltage. Likewise, in period T2 of FIG. 2B, first data line FD1 charges/discharges second data line SD12 through turned on data line switch DS12 according to corresponding data voltage, and second data line SD12 charges/discharges pixel P112 through turned on pixel switch PW112 according to corresponding data voltage. At this time, because gate line G2 is also enabled, second data line SD12 also charges/discharges pixel P212 according to corresponding data voltage through turned on pixel switch PW212. Likewise, in period T3 of FIG. 2B, first data line FD1 charges/discharges second data line SD13 through turned on data line switch DS13 according to corresponding data voltage, and second data line SD13 charges/discharges pixel P113 through turned on pixel switch PW113 according to corresponding data voltage. At this time, because gate line G2 is also enabled, second data line SD13 also charges/discharges pixel P213 through turned on pixel switch PW213 according to corresponding data voltage. As shown in FIG. 2B, polarities of pixel P111 and pixel P211 are the same, polarities of pixel P112 and pixel P212 are the same, and polarities of pixel P113 and pixel P213 are the same. Thus, pixel P211, pixel P212 and pixel P213 have already been pre-charged/pre-discharged by data voltages corresponding to pixel P111, pixel P112, and pixel P113 prior to being charged by corresponding data voltages. Thus, liquid crystal display 200 may increase charging rate of pixel P211, pixel P212 and pixel P213. Additionally, operation timings of other gate lines liquid crystal display 200 are similar to those of gate line G1 and gate line G2, and are not described again here.

Figure 3A:
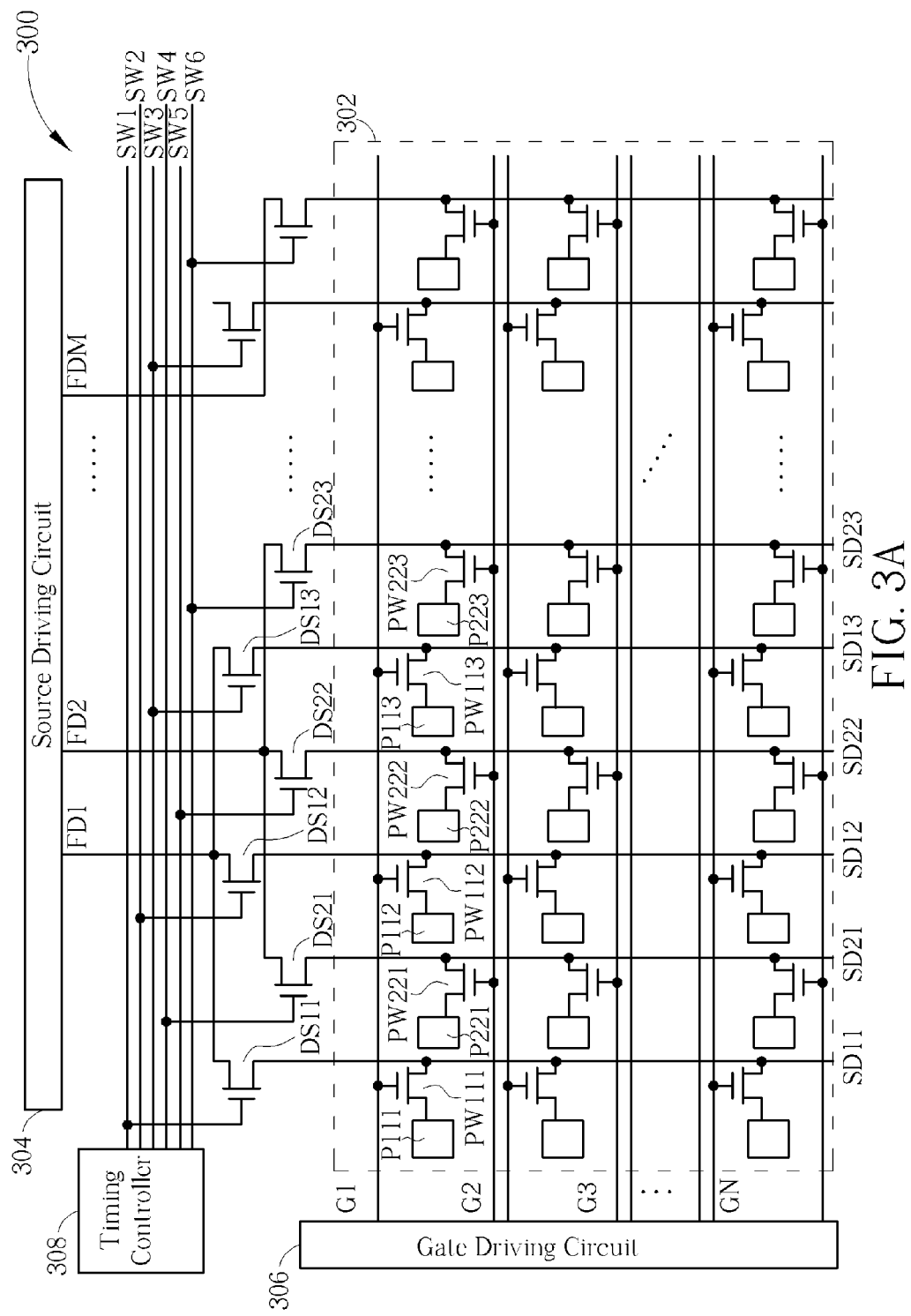
FIG. 3A is a diagram illustrating a liquid crystal display according to an embodiment.
Figure 3B:
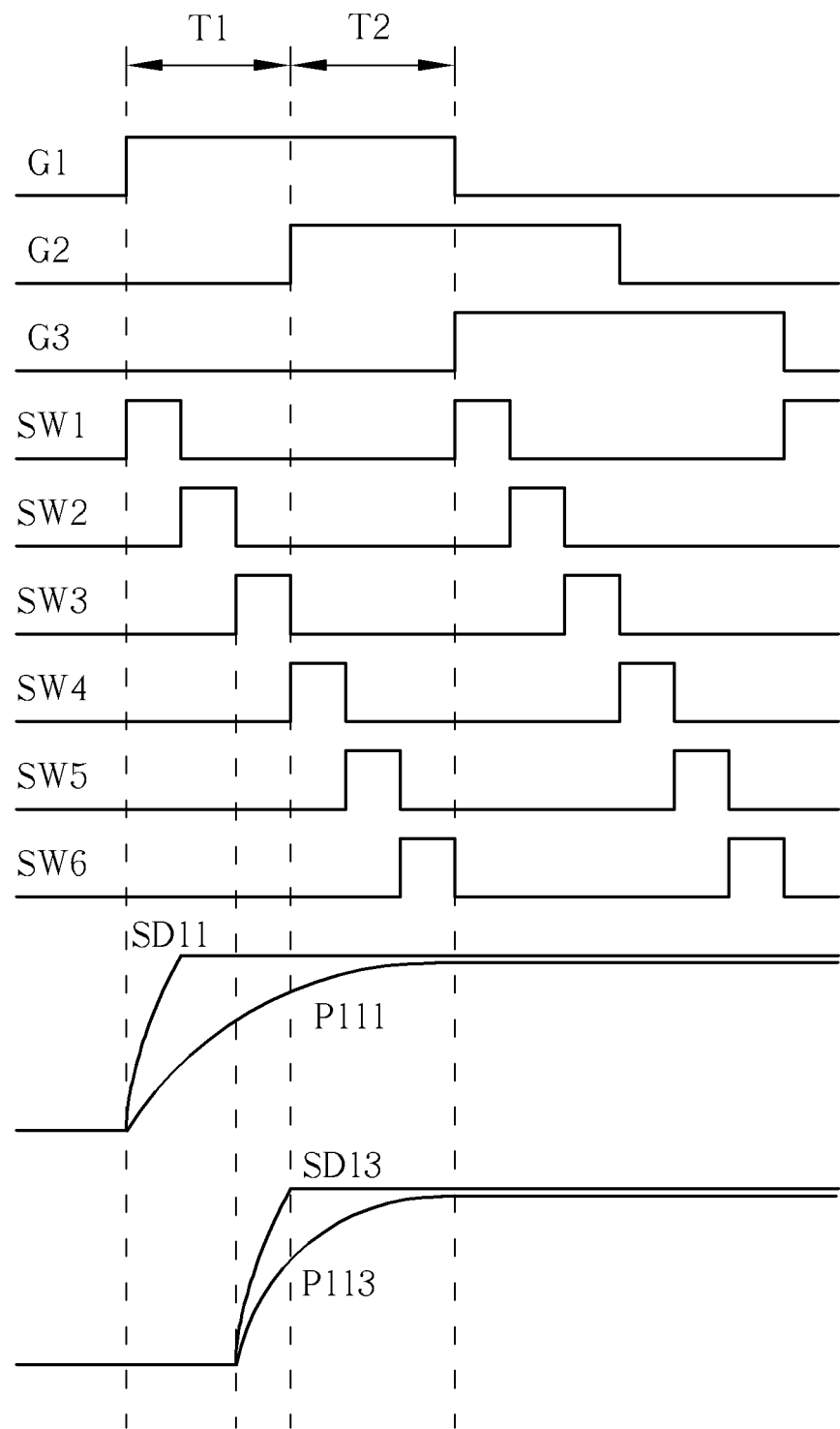
FIG. 3B is a diagram illustrating operation timings of liquid crystal display.

Please refer to FIG. 3A and FIG. 3B. FIG. 3A is a diagram illustrating a liquid crystal display 300 according to an embodiment. FIG. 3B is a diagram illustrating operation timings of liquid crystal display 300. Liquid crystal display 300 comprises LCD panel 302, source driving circuit 304, gate driving circuit 306, timing controller 308. LCD panel 302 comprises a plurality of pixels, where each pixel of the plurality of pixels is coupled to a corresponding pixel switch, and each pixel switch is an N-type thin-film transistor or a P-type thin-film transistor. Additionally, each pixel switch has a first terminal coupled to a corresponding pixel, a second terminal coupled to a corresponding gate line, and a third terminal coupled to a corresponding second data line. For example, pixel switch PW111 has a first terminal coupled to pixel P111, a second terminal coupled to gate line G1, and a third terminal coupled to second data line SD11. Source driving circuit 304 is used for converting image data into a plurality of data voltages and enabling M first data lines FD1-FDM, where M is a positive integer, each first data line of the M first data lines FD1-FDM corresponds to a plurality of data line switches, and each first data line is charged/discharged according to corresponding data voltage, where each data line switch corresponds to a second data line and one of six switch enable lines SW1-SW6, and data line switches are N-type thin-film transistors or P-type thin-film transistors, but the present invention is not limited to six switch enable lines SW1-SW6. For example, first data line FD1 corresponds to three data line switches DS11, DS12, DS13, first data line FD2 corresponds to three data line switches DS21, DS22, DS23, data line switches DS11 corresponds to second data line SD11 and switch enable line SW1, data line switch DS12 corresponds to second data line SD12 and switch enable line SW2, data line switch DS13 corresponds to second data line SD13 and switch enable line SW3, data line switch DS21 corresponds to second data line SD21 and switch enable line SW4, data line switch DS22 corresponds to second data line SD22 and switch enable line SW5, and data line switch DS23 corresponds to second data line SD23 and switch enable line SW6. Additionally, each data line switch has a first terminal coupled to a corresponding first data line, a second terminal coupled to a corresponding switch enable line, and a third terminal coupled to a corresponding second data line. For example, data line switch DS11 has a first terminal coupled to first data line FD1, a second terminal coupled to switch enable line SW1, and a third terminal coupled to second data line SD11. Gate driving circuit 306 is used for enabling N gate lines G1-GN, where N is a positive integer, two neighboring gate lines have partially overlapping enable signals, and two neighboring pixel switches of each row of pixels in LCD panel 302 turn on and turn off according to enable signals of two corresponding gate lines, respectively. For example, pixel switch PW111 turns on and turns off according to enable signal of gate line G1, and pixel switch PW221 turns on and turns off according to enable signal of gate line G2. Timing controller 308 is used for sequentially enabling a plurality of switch enable lines SW1-SW6.

As shown in FIG. 3B, in region T1, gate line G1 is enabled and switch enable lines SW1, SW2, SW3 are enabled sequentially, where enable signal of gate line G1 is as long as the sum of lengths of enable signals of switch enable lines SW1, SW2, SW3. However, the present invention is not limited thereto, namely enable signal of gate line G1 may have length longer than the sum of lengths of enable signals of switch enable lines SW1, SW2, SW3. Thus, when switch enable line SW1 and gate line G1 are both enabled, first data line FD1 charges second data line SD11 through turned on data line switch DS11 according to corresponding data voltage, and second data line SD11 charges pixel P111 through turned on pixel switch PW111 according to corresponding data voltage. When switch enable line SW2 and gate line G1 are both enabled, first data line FD1 charges second data line SD12 through turned on data line switch DS12 according to corresponding data voltage, and second data line SD12 charges pixel P112 through turned on pixel switch PW112 according to corresponding data voltage. When switch enable line SW3 and gate line G1 are both enabled, first data line FD1 charges second data line SD13 through turned on data line switch DS13 according to corresponding data voltage, and second data line SD13 charges pixel P113 through turned on pixel switch PW113 according to corresponding data voltage. Likewise, in region T2, operation of gate line G2, second data line FD2 and switch enable lines SW4, SW5, SW6 is similar to that of gate line G1, second data line FD1 and switch enable lines SW1, SW2, SW, and is not described again here. As shown in FIG. 3B, enable signal of gate line G1 continues to region T2, so that pixel P111, pixel P112 and pixel P113 are all charged continuously up to region T2, i.e. in the partially overlapping period (region T2) of enable signal of gate line G1 and enable signal of gate line G2, pixel P111, pixel P112 and pixel P113 are charged continuously. In this way, liquid crystal display 300 may have increased pixel charging rate. Operation timings of remaining gate lines of liquid crystal display 300 are the same as those of gate line G1 and gate line G2, and are not described again here.

Figure 4:
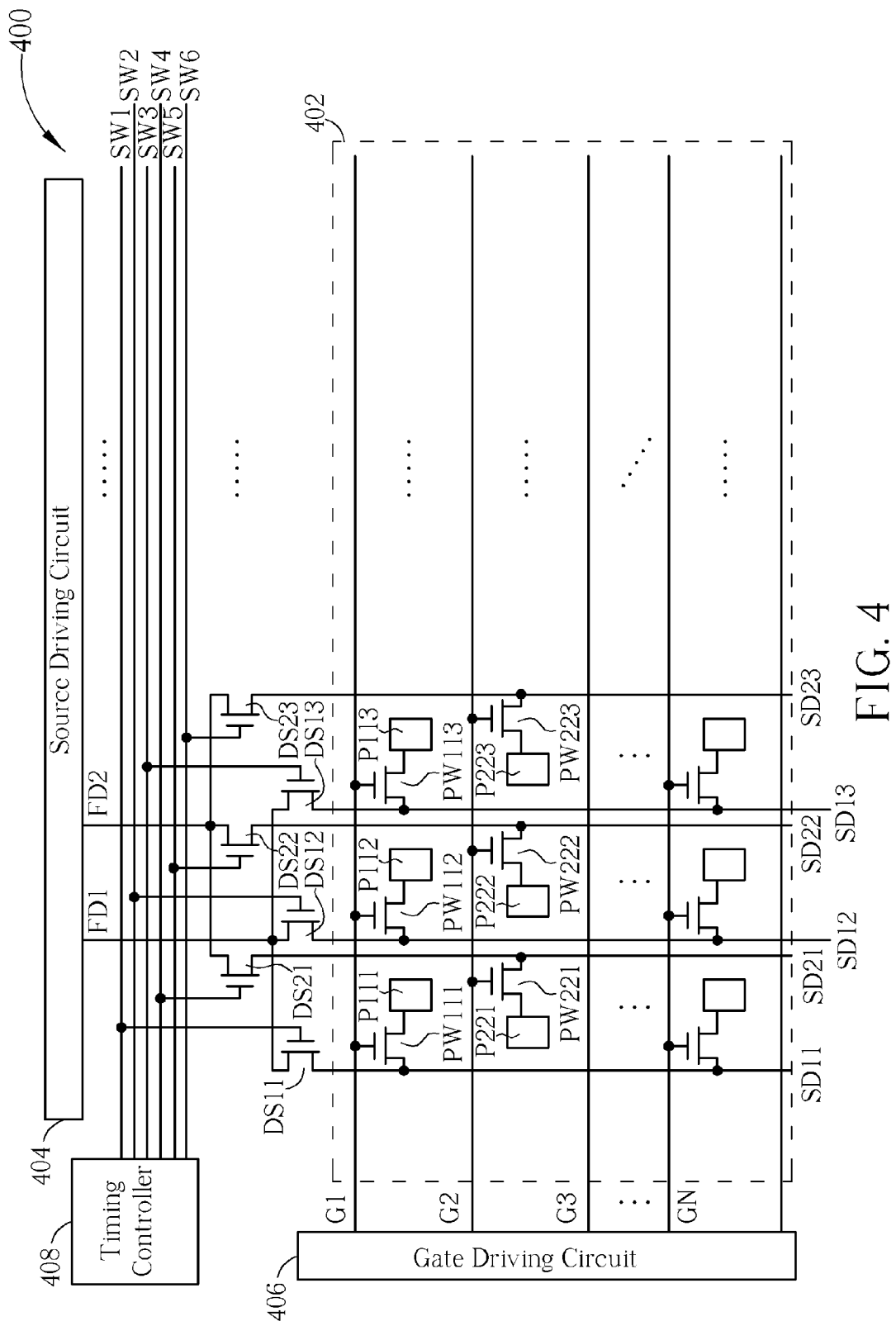
FIG. 4 is a diagram of liquid crystal display according to an embodiment.

Please refer to FIG. 4, which is a diagram of liquid crystal display 400. Liquid crystal display 400 comprises LCD panel 402, source driving circuit 404, gate driving circuit 406, and timing controller 408. Liquid crystal display 400 differs from liquid crystal display 300 in that each pixel switch of each row of pixels in LCD panel 402 turns on and turns off according to enable signal of gate line corresponding to each row of pixels, and each two neighboring pixels of each column of pixels in LCD panel 402 are charged/discharged according to corresponding data voltages of two second data lines corresponding to each row of pixels respectively. For example, pixel P111, pixel P112 and pixel P113 turn on and turn off according to enable signal of gate line G1, and pixel P111 and pixel P221 are charged/discharged according to data voltages of second data line SD11 and second data line SD21. Operation principles and timings of liquid crystal display 400 are similar to those of liquid crystal display 300, and are not described again here.

Figure 5:
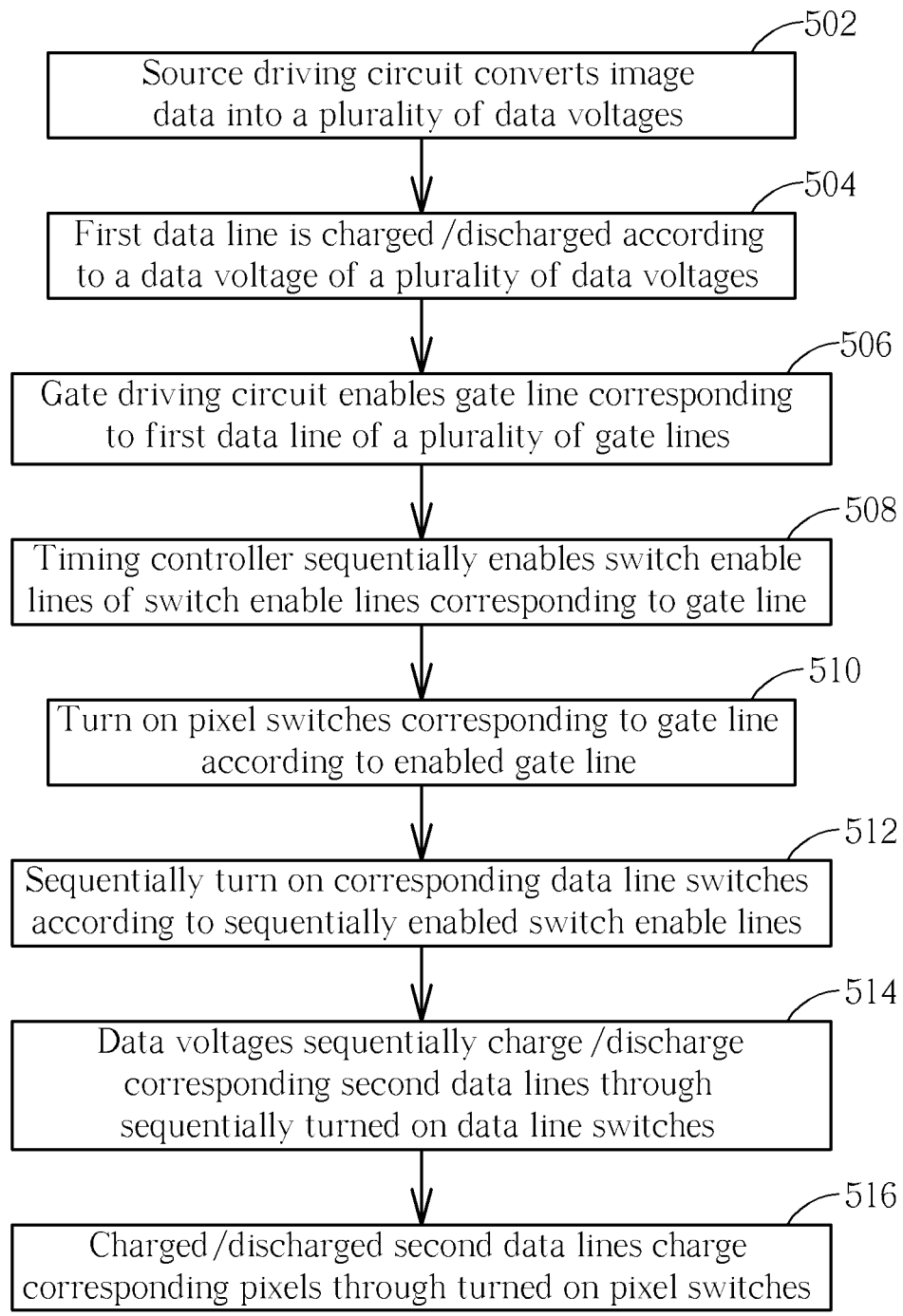
FIG. 5 is a flowchart of a method of charging/discharging pixels of a liquid crystal display according to an embodiment.

Please refer to FIG. 5, which is a flowchart of a method of charging/discharging pixels of a liquid crystal display according to an embodiment. The method shown in FIG. 5 is illustrated with reference to liquid crystal display 300 of FIG. 3A, and comprises the following steps:

Step 502: Source driving circuit 304 converts image data into a plurality of data voltages;

Step 504: First data line FD1 is charged/discharged according to a data voltage of a plurality of data voltages;

Step 506: Gate driving circuit 306 enables gate line G1 corresponding to first data line FD1 of a plurality of gate lines G1-GN;

Step 508: Timing controller 308 sequentially enables switch enable lines SW1-SW3 of switch enable lines SW1-SW6 corresponding to gate line G1;

Step 510: Turn on pixel switches PW111-PW113 corresponding to gate line G1 according to enabled gate line G1;

Step 512: Sequentially turn on corresponding data line switches DS11-DS13 according to sequentially enabled switch enable lines SW1-SW3;

Step 514: Data voltages sequentially charge/discharge corresponding second data lines SD11-SD13 through sequentially turned on data line switches DS11-DS13;

Step 516: Charged/discharged second data lines SD11-SD13 charge corresponding pixels P111-P113 through turned on pixel switches PW111-PW113.

In step 508, enable signal of gate line G1 is as long as the sum of lengths of enable signals of switch enable lines SW1, SW2, SW3. However, the present invention is not limited thereto, namely enable signal of gate line G1 may be longer than the sum of lengths of enable signals of switch enable lines SW1, SW2, SW3. In step 514, data voltage on first data line FD1 sequentially charges/discharges second data lines SD11-SD13 through sequentially turned on data line switches DS11-DS13. Thus, in step 516, charged/discharged second data lines SD11-SD13 sequentially charge/discharge pixels P111-P113 through turned on pixel switches PW111-PW113. Likewise, as shown in FIG. 3A, data voltage on first data line FD2 charges pixels P221-P223 according to steps shown in FIG. 5, where pixels P221-P223 correspond to gate line G2. Thus, in the embodiment of FIG. 5, pixels P111-P113 charged/discharged during enable signal of gate line G1 are on the same row as pixels P221-P223 charged/discharged during enable signal of G2. Additionally, second data lines SD11-SD13 continuously charge/discharge pixels P111-P113 through turned on pixel switches PW111-PW113 during partially overlapping period of enable signal of gate line G1 and enable signal of gate line G2.

Additionally, in another embodiment of FIG. 5 (corresponding to liquid crystal display 400 of FIG. 4), data voltage on first data line FD2 charges/discharges pixels P221-P223 according to the steps of FIG. 5, where pixels P221-P223 correspond to gate line G2. Thus, in another embodiment of FIG. 5, pixels P111-P113 charged/discharged during enable signal of gate line G1 and pixels P221-P223 charged/discharged during enable signal of gate line G2 are pixels of two neighboring rows.

In summary, liquid crystal displays and methods of charging/discharging pixels of liquid crystal displays disclosed above utilize two consecutive, partially overlapping gate line enable signals and sequentially enabled switch enable lines to extend charging/discharging time of pixels. Thus, the embodiments increase pixel charging rate to improve on the problem of the prior art of different charging rates between pixels corresponding to the same first data line.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display (LCD) comprising:
   an LCD panel comprising a plurality of pixels arranged in rows, pixels in each row arranged alternatively between odd and even pixels of the plurality of pixels;
   a timing controller having a plurality of switch enable lines and configured to enable data line switches;
   a source driving circuit configured to convert image data into data voltages and to control the plurality of pixels using the data voltages, the plurality of pixels being coupled to the source driving circuit by having each of the plurality of pixels coupled to a second data line of a plurality of second data lines, the data line switches coupling the plurality of second data lines to a first data line of a plurality of first data lines, the plurality of first data lines being coupled to the source driving circuit, several odd pixels of a row of pixels of the plurality of pixels being coupled to one first data line of the plurality of first data lines and several even pixels of the row of pixels being coupled to another one first data line of the plurality of first data lines; and a gate driving circuit configured to enable the plurality of pixels, the plurality of pixels receiving enable signals from a plurality of gate lines coupled to the gate driving circuit, the odd pixels of a first row of pixels being coupled to a first gate line of the plurality of gate lines, and the even pixels of the first row of pixels being coupled to a second gate line of the plurality of gate line, wherein a first enable signal of the enable signals for the first gate line partially overlaps a second enable signal of the enable signals for the second gate line so that a duration between a falling edge of the first enable signal for the first gate line and a raising edge of the second enable signal for the second gate line is substantially equal to a sum of durations of switch enable signals being applied to switch enable lines, of the plurality of switch enable lines, configured to enable the data line switches coupling to only the even pixels connected to the second gate line.

2. The liquid crystal display of claim 1, wherein duration of an enable signal being applied to each gate line of the plurality of gate lines is equal to a sum of durations enable signals being applied to the plurality of switch enable lines.

3. The liquid crystal display of claim 1, wherein duration of an enable signal being applied to each gate line of the plurality of gate lines is larger than a sum of durations of enable signals being applied to the plurality of switch enable lines.

4. The liquid crystal display of claim 1, wherein the row of pixels corresponding to the gate line continue to be charged or discharged by a plurality of second data lines corresponding to the gate line when the enable signals being applied to the gate line overlap the enable signals being applied to the next gate line.

5. The liquid crystal display of claim 1, wherein each data line switch has a first terminal coupled to a corresponding first data line, a second terminal coupled to a corresponding switch enable line, and a third terminal coupled to a corresponding second data line.

6. The liquid crystal display of claim 1, wherein each pixel switch has a first terminal coupled to a corresponding pixel, a second terminal coupled to a corresponding gate line, and a third terminal coupled to a corresponding second data line.

* * * * *